United States Patent [19]

Lokerson

[11] 4,039,754
[45] Aug. 2, 1977

[54] SPEECH ANALYZER

[75] Inventor: Donald C. Lokerson, New Carrollton, Md.

[73] Assignee: The United States of America as represented by the Administrator of the National Aeronautics and Space Administration, Washington, D.C.

[21] Appl. No.: 566,494

[22] Filed: Apr. 9, 1975

[51] Int. Cl.² ............................................. G10L 1/00
[52] U.S. Cl. ................................. 179/1 SA; 179/1 SP
[58] Field of Search ................ 179/1 SA, 1 SD, 1 SP

[56] References Cited

U.S. PATENT DOCUMENTS

| | | | |
|---|---|---|---|
| 2,481,247 | 9/1949 | Schott | 179/1 SP |
| 2,613,273 | 10/1952 | Kalfaian | 179/1 SP |
| 3,215,934 | 2/1965 | Sallen | 179/1 SA |
| 3,521,235 | 7/1970 | Becker | 179/1 SA |
| 3,553,372 | 1/1971 | Wright | 179/1 SD |
| 3,627,912 | 12/1971 | Hearn | 179/1 SP |
| 3,662,374 | 5/1972 | Harrison | 179/1 SA |
| 3,755,627 | 8/1973 | Berkowitz | 179/1 SD |
| 3,870,817 | 3/1975 | Kalfaian | 179/1 SA |

*Primary Examiner*—Kathleen H. Claffy
*Assistant Examiner*—E. S. Kemeny
*Attorney, Agent, or Firm*—Ronald F. Sandler; John R. Manning

[57] ABSTRACT

A speech signal is analyzed by applying the signal to formant filters which derive first, second and third signals respectively representing the frequency of the speech waveform in the first, second and third formants. A first pulse train having approximately a pulse rate representing the average frequency of the first formant is derived; second and third pulse trains having pulse rates respectively representing zero crossings of the second and third formants are derived. The first formant pulse train is derived by establishing N signal level bands, where N is an integer at least equal to two. Adjacent ones of the signal bands have common boundaries, each of which is a predetermined percentage of the peak level of a complete cycle of the speech waveform. A first level of the first pulse train is derived while the first formant signal has an amplitude lying in even numbered ones of the bands; a second level is derived while the first formant signal has an amplitude lying in odd number ones of the band. The pulse trains representing the first and third formant signals are normalized relative to the second formant pulse train. Normalization is attained in each instance by counting the number of pulses in the first and third pulse trains over the interval required for the pulses in the second train to reach a predetermined number. The resulting normalized pulse trains are supplied to a memory to identify a phoneme in the speech signal or are transmitted as narrow band width signals.

28 Claims, 10 Drawing Figures

SPEECH ANALYZER

ORIGIN OF THE INVENTION

The invention described herein was made by an employee of the United States Government and may be manufactured and used by or for the Government for govermental purposes without the payment of any royalties thereon or therefor.

FIELD OF THE INVENTION

The present invention relates generally to speech analyzers and more particularly to a speech analyzer wherein signals representing the frequency content of a pair of formants are compared with each other. In accordance with another aspect of the invention, a speech quantizer derives a bilevel signal having first and second levels while the speech signal has amplitudes respectively lying in even and odd numbered signal level amplitude bands, where adjacent bands have common boundaries.

BACKGROUND OF THE INVENTION

Devices to analyze speech waveforms have application to assist the deaf and for narrow band width communications. For both applications, each speech utterance, i.e., phoneme, is coded into a different signal, whereby each phoneme has a unique relationship to the coded signal. To assist the deaf, the unique phoneme to signal relationship is utilized to activate an indicator, usually visual, that the deaf can perceive. For narrow band width communication systems the speech signal is transformed into phoneme indicating signals having a band width that is less than approximately 100 bits per second.

Prior art speech analyzers have generally fallen into one of three categories, each of which appears to have certain deficiencies. One of the most commonly employed prior art devices has used detectors for determining when a speech waveform crosses a predetermined amplitude, typically the average, or zero, value of the waveform. Devices of this nature are often referred to as zero crossing detectors since they derive pulse outputs in response to the waveform crossing the zero value. Typically, the number of pulses derived over a predetermined time interval provides an indication of the frequency of the speech waveform. Zero crossing detectors have a tendency to respond only to a frequency component having the highest amplitude, particularly when one frequency component has an amplitude that is much higher than any of the other frequency components. For the first formant (typically 270–730 Hertz), where there is appreciable, important information in frequency components having lower amplitudes than a peak component, this tendency may result in serious loss of information. If two or more frequencies have approximately the same amplitude, the zero crossing detector has a tendency to capture either the highest frequency or the lowest frequency in the waveform, depending upon adjustments made to the zero crossing detector. By responding or capturing the highest or lowest frequency the prior art devices have not been well suited to provide accurate information for speakers having widely differing glottal or fundamental frequencies, as exist between men, woman and children.

Another type of prior art speech analyzer has employed relatively complex apparatus for analyzing the speech spectrum in raw form. Such analyzers typically employ a bank of many parallel bandpass filters responsive to a speech source. Each filter supplies energy in a relatively narrow pass band to an associated amplitude detector and the detectors drive relatively complex processing circuitry. It has been found that such analyzers, in addition to being relatively complex, suffer from the deficiency of providing excessive information. The amount of information derived is often so great tht difficulties arise in coding the resultant information into an indication of the uttered phoneme. A further deficiency in spectrum analyzers is that they do not consider phase information of the different components that form a phoneme. Instead, there is derived a d.c. signal indicative of the phoneme amplitude.

The third type of proposed speech analyzer is capable of learning the characteristics of different speakers. Such systems, however, must generally be programmed for each individual speaker and are not usually adapted to analyze the speech of a wide variety of speakers whose speech patterns have not been programmed into a memory of the analyzer.

BRIEF DESCRIPTION OF THE INVENTION

In accordance with one aspect of the present invention, an improved speech quantizer provides information regarding the amplitude, frequency and phase of a speech waveform, and in particular the first formant. The improved quantizer derives a bilevel. i.e., signal having first and second levels while the speech waveform has amplitudes respectively lying in even and odd numbered amplitude bands; there are thereby at least two, and preferably more than two, amplitude bands. The bands have common boundaries, each of which is a predetermined percentage of the peak level of one complete cycle of the speech waveform. Since each of the boundaries is a predetermined percentage of the peak level of one cycle of the waveform, the speech waveform amplitude is normalized. Establishing the boundaries is attained in a relatively simple manner by supplying the speech waveform to an automatic gain control (AGC) amplifier, which derives an output that is applied to a number of amplitude detectors. In response to alternate ones of the amplitude detectors being activated alternate triggering levels are supplied to a Schmitt trigger which derives the bilevel signals.

While there are prior art systems wherein the average frequency of a speech wave is computed to determine the centroid of the output of a formant filter, as disclosed in U.S Pat. Nos. 3,078,345 and 2,857,465 to Campanella and Schroeder, the prior art systems employ relatively complex computer circuitry that is not easily implemented. In addition, Campanella requires a plurality of narrow bandpass filters to determine discrete frequency components in each formant.

In accordance with a further aspect of the invention, the speech signal is divided into first, second and third formants and the frequency content indication for the second formant normalizes the signals indicative of the frequency content of the third and/or first formants. By normalizing the first and third formant frequencies relative to the second formant frequency it is possible to accurately analyze the speech of difference speakers. For any particular phoneme, the fundamental frequency of a woman or child is generally shifted upwardly by approximately 10% relative to that of a man. This usually causes a 10% displacement of the speech content of the different types of speakers over each of the three formants. By normalizing the frequencies of the first and third formants relative to the second formant frequency, particularly by taking the ratio for the first to second formants and third to second formants, compensation is provided for the shift in fundamental frequency of different speakers. Signals indicative of the frequency contents of the two normalized formants can be applied to a two dimensional memory matrix, to indicate the original uttered phoneme. The matrix can be in direct proximity to the speech source, for deaf applications, or at the end of a transmission link for narrow band width transmission applications.

The signal indicative of the first formant frequency content is derived by utilizing the quantizer that derives the bilevel signal indicative of frequency, amplitude and phase, as described supra. For the second and third formants, where the frequency information is dominant over the amplitude information, a zero crossing detector may be employed to provide the frequency information. It is necessary to employ the frequency, amplitude and phase quantizer for the second and third formants because the tendency for different frequencies to be clustered in close proximity to each other does not exist in these formants to the samd extent as in the first formant. Hence, for the second and third formants the zero crossing detector has a frequency error, in absolute terms, that is considerably less than the error for the first formant.

In accordance with another aspect of the invention, normalization of the frequency content of the first and second formants and the third and second formants is provided with a relatively simple apparatus utilizing first and second counters respectively responsive to pulse trains representing the frequency content of the first and third formants and a predetermined counter responsive to a pulse train representing the frequency of the second formant. In response to the predetermined count being reached, the contents of the two counters responsive to the first and third formant pulse trains are frozen and ultimately read out.

It is accordingly an object of the present invention to provide a new and improved speech analyzer.

Another object of the invention is to provide a speech analyzer employing a quantizer that responds to the relative amplitude of different frequencies of a speech signal.

A further object of the invention is to provide a new and improved speech analyzer wherein an accurate indication of phoneme utterance is provided for speakers having widely varying speech characteristics.

An additional object of the invention is to provide a speech analyzer wherein the frequency content of one formant is normalized against another formant.

Still another object of the invention is to provide a new and improved digital speech analyzer that is relatively simple and yet provides accurate information of the relative amplitude and frequencies which compose phoneme and other sources used in communications; exemplary of the other sounds are sirens; whistles, telephone rings and door knocks.

Still another object of the invention is to provide an apparatus for phoneme distinction or segmentation and conversion to digital output code by using a digital table look-up scheme.

The above and still further objects, features and advantages of the present invention will become apparent upon consideration of the following detailed description of one specific embodiment thereof, espeically when taken in conjunction with the accompanying drawing.

DETAILED DESCRIPTION OF THE DRAWING

Figure 1:
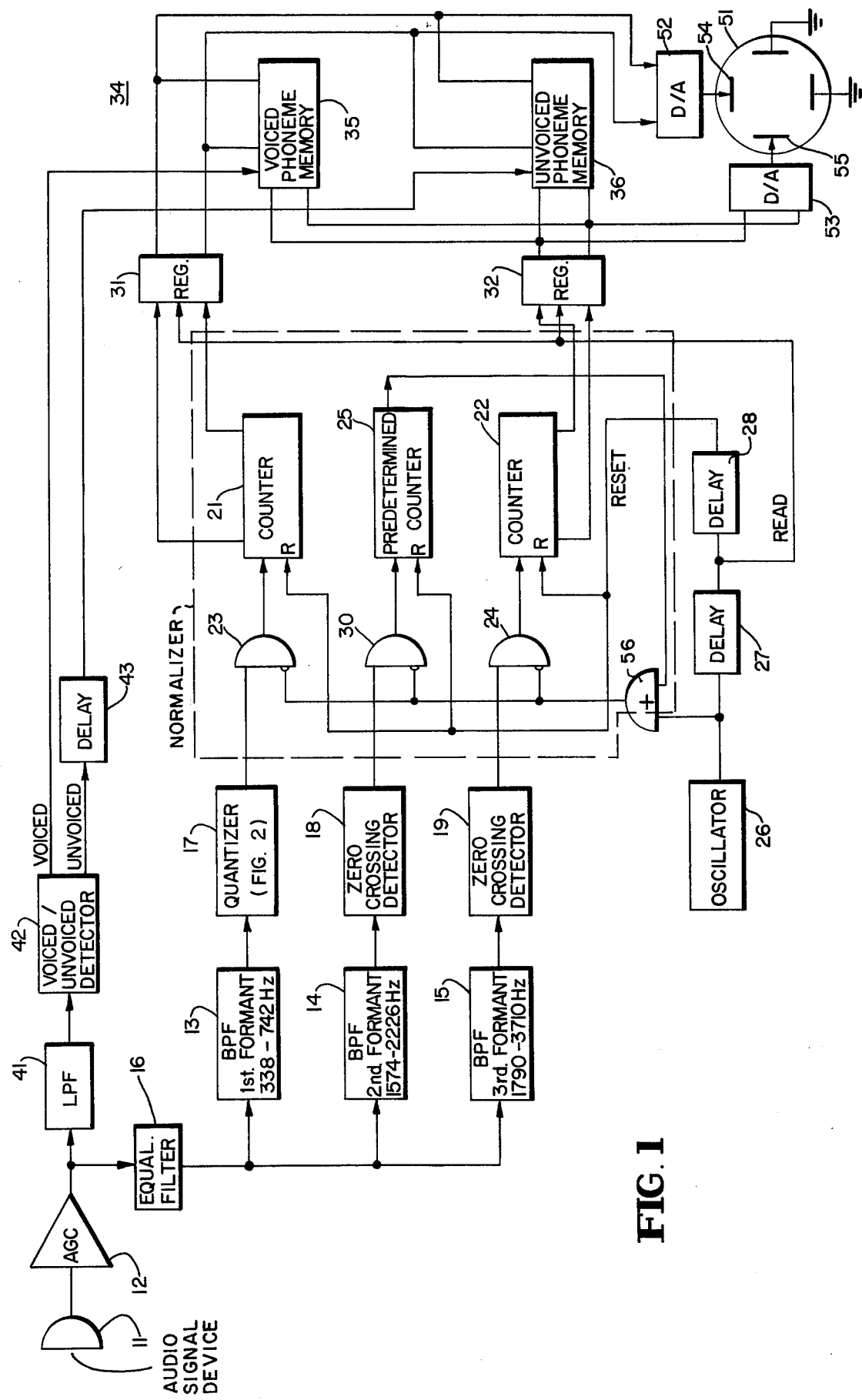
FIG. 1 is an overall block diagram of a preferred invention.

Reference is now made to FIG. 1 of the drawing wherein there is illustrated, in block diagram form, one embodiment of a speech analyzer in accordance with the present invention. A speech signal to be analyzed is derived from a suitable source, e.g., microphone 11, which feeds automatic gain control (AGC) amplifier 12. Amplifier 12 derives an output signal such that the speech waveform has approximately the same peak amplitude over each complete cycle, i.e., phoneme, whereby a speech waveform having a normalized maximum amplitude is derived from the amplifier.

The normalized output signal of amplifier 12 is applied in parallel to processing circuitry including bandpass, formant filters 13, 14 and 15 respectively having pass bands for the first, second and third formants. Filters 13, 14 and 15 have pass bands ($F_1$, $F_2$ and $F_3$) (bandpasses between minus 3db points) as follows:

358 Hertz $\leq F_1 \leq$ 742 Hertz
1074 Hertz $\leq F_2 \leq$ 2226 Hertz
1790 Hertz $\leq F_3 \leq$ 3710 Hertz While filters 13-15 have pass bands in the stated frequency range, the skirts of these filters are not very steep so that appreciable energy in frequencies outside of the pass bands thereof is derived. Thereby, the output of filter 13 includes frequency components in excess of its high frequency cutoff of 742 Hertz and filter 14 passes frequencies lower than its low frequency cutoff of 1074 Hertz. Active equalization filter 16 is connected between the output of amplifier 12 and the inputs of each of filters 13-15 to increase the amplitude of the high frequencies relative to the low frequencies and provide a uniform amplitude versus frequency characteristic for the analyzer.

Formant filters 13, 14 and 15 derive analog output signals that are respectively applied to frequency analyzers 17, 18 and 19. Frequency analyzers 18 and 19, for the second and third formants, are conventional zero crossing detectors that derive a pulse each time a positive going portion of the waveform applied to them goes through zero by using adjustable amplitude Schmitt trigger and/or threshold circuits. Hence, detectors 18 and 19 respectively derive pulse trains having pulse rates proportional to the frequencies of the second and third formants.

Frequency analyzer 17, responsive to the first formant signal derived from filter 13, however, provides an indication of the relative amplitude and phase of the different frequencies applied to it. The number of pulses derived by quantizer 17 appears to be related to the average frequency of the signal applied to it; the term "average frequency" is related to the frequency and relative amplitudes of the different components supplied to quantiziers 17. For example, if the input to quantizer 17 is represented by:

$$f(t) = A_1 \cos(\omega_1 t + \phi_1) + A_2 \cos(\omega_2 t + \phi_2)$$
$$+ \ldots + A_n \cos(\omega_n t + \phi_n) \qquad (1)$$

where:

$\omega_1, \omega_2, \ldots \omega_n$ are $2\pi$ times the frequency components $(f_1, f_2 \ldots f_n)$ applied to the quantizer, $A_1, A_2, \ldots A_n$ are respectively the amplitudes of the components $\omega_1, \omega_2, \ldots \omega_n$, and $\phi_1, \phi_2, \ldots \phi_n$ are the phases of $\omega_1\phi_2, \ldots \omega_n$, the average frequency, $\bar{f}$, of the input of quantizer 17 is reproduced as:

$$n\bar{f} = A_1 f_1 + A_2 f_2 + \ldots + A_n f_n \qquad (2)$$

The output pulses of quantizer 17 and zero crossing detector 19, representing the frequency contents of the first and third formants, are normalized against the number of output pulses of detector 18, representing the frequency content of the second formant. Normalization is performed by taking the approximate ratio of the number of pulses derived from quantiizer 17 and detector 18 over a predetermined time interval and the number of pulses derived from detectors 19 and 18 over the same time interval. In particular, the frequency contents of the first and third formants are normalized relative to the second formant by detecting the number of output pulses of quantizer 17 and detector 19 over the time interval required for detector 18 to reach a predetermined count. The normalized counts are periodically read out to an analyzer apparatus. If the number of pulses derived from detector 18 fails to reach the predetermined count within a predetermined time interval, referred to as a sampling interval and equal to the interval between adjacent read out operations to the analyzer, the counts from quantizer 17 and detector 19 during the sampling interval are read out to the analyzer. In one embodiment, the sampling interval is 60 milliseconds and the predetermined count eqauls 64.

To these ends, the output signals of quantizer 17 and zero crossing detector 19 are respectively applied through inhibit gates 23 and 24 to eight bit counters 21 and 22. The output of zero crossing detector 18 is applied through inhibit gate 30 to predetermined counter 25 which derives a binary one level in response to a predetermined number of pulses, such as 64, being applied to it since the last time it was reset; prior to counter 25 reaching a count of 64, a binary zero is derived from the output thereof. The binary one output of counter 25 is applied to the inhibit inputs of gates 23, 24 and 30, thereby freezing the contents of counters 21, 22 and 25 until the counters reset Counters 21, 22 and 25 are periodically reset in response to each output pulse of oscillator 26; each output pulse has sufficient length to enable resetting and read out of counters 21, 22 and 25. Typically, output pulses of oscillator 26 are derived once every 60 milliseconds and have approximately a 50 microsecond duration which also inhibit counters 21, 22 and 25 via OR gate 56 and inhibit gates 23, 30 and 24. The output pulses of oscillator 26 are applied to the inhibit terminals of gates 23, 24 and 30 through OR gate 56 to positively prevent coupling of pulses from quantizer 17 and detectors 18 and 19 into counters 21, 22 and 25 if the inhibit inputs of these gates were not previously activated by the output of counter 25 during the sampling interval being considered.

Delay networks 27 and 28, cascaded to the output of oscillator 26, respond to the leading edge of the pulse output of oscillator 26 to provide suitable delays (each typically 20 microseconds) for enabling the contents of counters 21 and 22 to be read out after the inputs to the counters have been previously inhibited by the output of oscillator 26 and to reset the counters after the contents thereof have been read out.

In the described embodiment the counters 21 or 22 are physically in the same integrated circuit package as the registers 31 or 32. The output of the delay circuit 27, the read pulse, is actually applied to the respective registers to transfer the contents of the counters to the related registers, the information being transferred in a parallel operation. After completion of this operation, the output of the delay network 28 is applied as a reset input to each of the counters 21, 22 and 25. In terms of actual timing of the sequence of events, after the read pulse has terminated, registers 31 and 32 store signals indicative of the counts of counters 21 and 22 upon the completion of a 60 millisecond sampling interval. Thereafter, counters 21, 22 and 25 are reset to zero by the output of delay network 28 and a new counting interval is subsequently initiated when the trailing edge of the output pulse of oscillator 26 occurs to remove the inhibit inputs via OR gate 56 from gates 23, 24 and 30.

The signals stored in registers 31 and 32 effectively represent the frequency content of the first formant relative to the second formant and the third formant relative to the second formant, respectively. Investigations I have conducted have led me to believe that frequencies of the different formants vary relatively uniformly for the same phoneme for different speakers. My studies further indicate that the approximately 40 different phonemes which constitute speech can be recognized for different speakers by comparing the frequencies of the first and third formants normalized against the second formant frequency.

To identify the different phonemes, the signals stored in registers 31 and 32 are applied to a read only memory 34 including voiced phoneme memory matrix 35 and unvoiced phoneme memory matrix 36. Memory matrices 35 and 36 are driven in parallel by the output signals of registers 31 and 32, as well as binary signals indicating whether a particular phoneme is a voiced or unvoiced utterance. The indication of a voiced or unvoiced utterance is derived by applying the output of amplifier 12 to low pass filter 41, which derives an output signal that is applied to a conventional voiced-/unvoiced detector 42. In response to a voiced phoneme being detected, a binary signal is supplied by detector 42 to memory matrix 35, causing that matrix to be activated in response to the output signals of registers 31 and 32. In response to an unvoiced phoneme being detected, detector 42 derives a binary one signal that is applied to matrix 36 via a delayed network 43. The delay of network 43 is equal to the time interval of a silent interval known to occur at the beginning of unvoiced phonemes.

Matrices 35 and 36 respond to the output signals of registers 31 and 32 to locate a phoneme that is uniquely defined by the output signals of the registers. Associated with each memory location in matrices 35 and 36 is an indicator. Thereby, the different phonemes are indicated in response to the indicator in memory matrices 35 and 36 being activated.

The indicators in matrices 35 and 36 can be in the form of lamps, for assistance to the deaf. In the alternative, the indicators can be utilized in a speech synthesizer to activate elements which cause utterances to be derived. In the latter instance, the device can be utilized in a narrow band width communication system.

The 60 millisecond sampling interval of the system described in connection with FIG. 1 is approximately one-half the length of a phoneme, according to generally accepted theory. Thereby, in response to a phoneme utterance, two successive, identical signals are usually derived from registers 31 and 32. For more positive phoneme identification, as well as for synthesizing applications, the outputs of memory 35 and 36 for successive sampling intervals can be determined and, if they are the same, indicated as a phoneme.

The device can also be utilized as a laboratory speech analyzing apparatus, in which case the output signals of registers 31 and 32, indicative of the normalized first and third formant frequencies, cause orthogonal X and Y deflection of a cathode ray beam included in cathode ray tube 51 that comprises an X-Y display. To these ends, the output signals of registers 31 and 32 are respectively applied to digital-to-analog converters 52 and 53 that drive the X and Y deflection electrodes 54 and 55 of cathode ray tube 51.

To derive a signal indicative of the average frequency of the first formant, quantizer 17 derives a bilevel signal having a first level while the first formant signal has an amplitude passing through even numbered ones of a plurality of signal level bands. In response to the output signal of filter 13 lying in the alternate, off numbered ones of the bands, quantizer 17 derives a second level of the binary signal. Adjacent ones of the signals level bands have common boundaries so that there is a transition in the output of quantizer 17 as the amplitude of the quantizer input has a transition from one band into another. Since AGC amplifier 12 is provided, each of the boundaries of the different bands is a predetermined percentage of the peak level of a complete cycle of the speech waveform. Thereby, the speech waveform applied to quantizer 17 is effectively normalized. Better normalization can, perhaps, be attained by connecting an AGC amplifier between the output of filter 13 and the input of quantizer 17.

Figure 2:
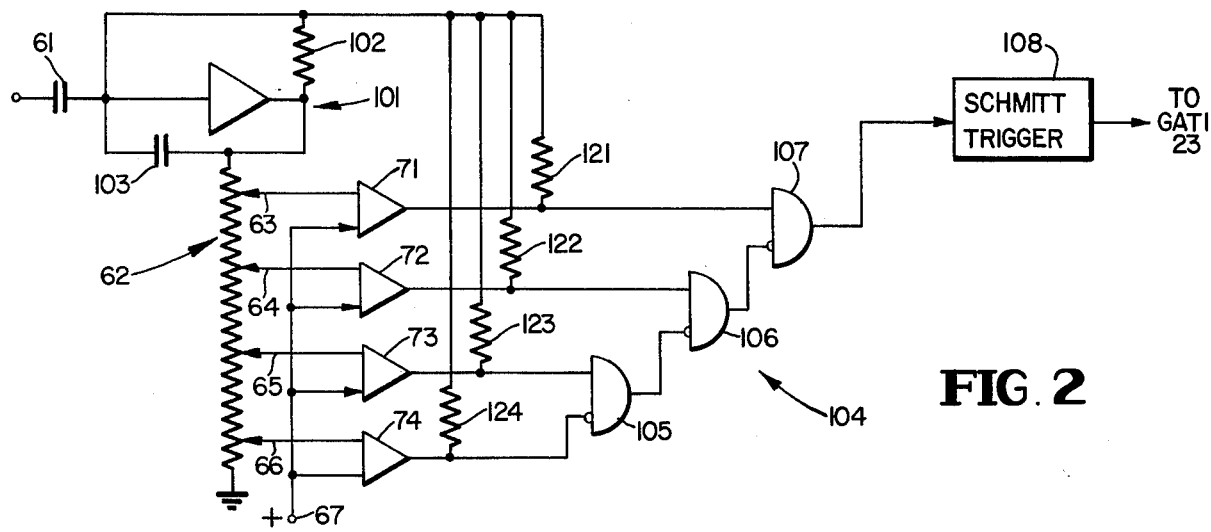
FIG. 2 is a circuit diagram of one embodiment of the quantizer of FIG. 1.

Quantizer 17, according to one embodiment, includes circuitry as illustrated in FIG. 2. The output of formant filter 13 is applied to voltage divider 62, having taps 63–66, by capacitor 61, which establishes an average, zero value for the AC undulations of the formant filter output; the capacitor drives operational amplifier 101 including a feedback circuit comprising resistor 102 and smoothing capacitor 103. the positions of taps 63–66 are selected in accordance with the predetermined percentages at which it is desired to establish boundaries for the different bands.

The voltages developed at taps 63–66 are respectively compared by analog comparators 71–74 with a d.c. reference voltage at terminal 67. Comparators 71–74 are arranged so that in response to the inputs thereof from taps 63–66 being greater than the positive d.c. voltage at terminal 67, positive d.c. voltages representing a binary one are derived therefrom. In response to the voltage applied to comparators 71–74 taps 63–66 being less than the voltage at terminal 67, comparators 71–74 derive output voltages of zero magnitude, to represent a binary zero. The output signals derived from comparators 71–74 drive logic network 104 that includes cascaded inhibit gates 105–107, the last of which may drive an optional voltage level detector, such as Schmitt trigger 108. Inhibit gates 105–107 are connected with each other and the outputs of comparators 71–74 so that alternating zero and one levels are derived from gate 107 as the output of amplifier 101 passes through different boundary levels indicated in FIG. 3A, as determined by the position of taps 63–66.

In operation, when the output of amplifier 101 is zero or less, indicated by the line 110 (FIG. 3A), none of comparators 71–74 derives a binary one output, so that a binary zero is derived from each of gates 105–107, as well as from trigger 108. In response to the output of amplifier 101 being between the levels indicated by boundaries 110 and 111, the voltage at tap 63 exceeds the voltage at terminal 67 but the voltages at taps 64–66 are less than that at terminal 67 so comparator 71 derives a binary one to the exclusion of the other comparators. The binary one output of comparator 71 is coupled through gate 107 to Schmitt trigger 108, causing a binary one to be derived from the quantizer output. In response to the output of amplifier 101 increasing further so that it lies between levels 111 and 112, comparators 71 and 72 derive binary one levels while comparators 73 and 74 derive binary zero levels. The binary one output of comparator 72 causes a binary one to be derived from gate 106, which inhibits gate 107 so that a low level is applied to Schmitt trigger 108, causing a binary zero to be derived from the quantizer. Similarly, when the output of amplifier 101 is between levels 112 and 113, comparators 71–73 derive binary one levels, to the exclusion of comparator 74; the binary one output of comparator 73 is passed through gate 105 to inhibit gate 106 so that the binary one output of comparator 71 is coupled to the input of Schmitt trigger 108, causing a binary one to be derived again from the quantizer. In response to the output of amplifier 101 being greater than level 113, each of comparators 71–74 derives a binary one level so that gate 105 is inhibited and gate 106 derives a binary one level that inhibits gate 107, causing a binary zero to be applied to and derived from Schmitt trigger 108. If necessary, to provide for more positive control of gates 105–107, feedback resistors 121–124 are optionally connected between the outputs of comparators 71–74 and the input of amplifier 101.

Figure 3A:
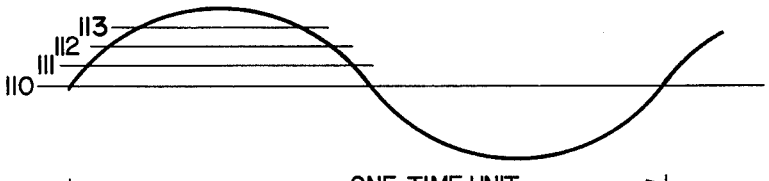
FIGS. 3A-6B are waveforms useful in describing the quantizer of FIG. 2.
Figure 3B:
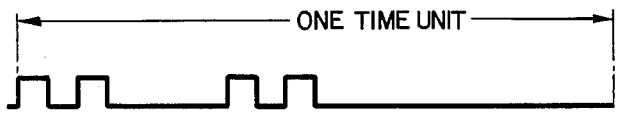
Figure 4A:
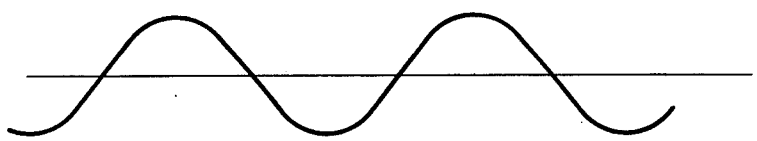
Figure 4B:
Figure 5A:
Figure 5B:
Figure 6A:
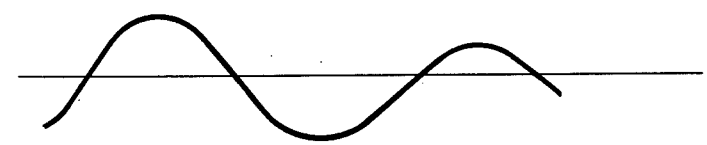
Figure 6B:

The manner in which the present invention provides a number of pulses commensurate with the average frequency of the signal derived from formant filter 13 is best illustrated by reference to the waveforms of FIGS. 3–6. The waveforms of FIGS. 3–6 all have the same maximum amplitude to provide a normalized situation. Output signals of formant filter 13 for four different phonemes are illustrated by FIGS. 3A–6A and the resultant binary signal derived from quantizer 17 for these phonemes are illustrated by FIGS. 3B–6B. FIG. 3A represents a wave that is a fundamental of a sinusoid; FIG. 4A represents the second harmonic of the sinusoid, phase shifted −90° (at the second harmonic frequency); FIG. 5A represents one-half of the fundamental plus one-half the amplitude of the phase shifted second harmonic; and FIG. 6A represents one-third the amplitude of the fundamental plus two-thirds the amplitude of the phase shifted second harmonic. Mathematically, the waveforms of FIGS. 3A–6A are represented as:

$$f_1(t) = \sin \omega t \tag{3}$$
$$f_2(t) = -\cos 2 \cdot t \tag{4}$$
$$f_3(t) = \tfrac{1}{2} \sin \omega t - \tfrac{1}{2} \cos 2 \omega t \tag{5}$$
$$f_4(t) = \tfrac{1}{3} \sin \omega t - \tfrac{2}{3} \cos 2 \omega t \tag{6}$$

The quantizer of FIG. 2 derives the pulse trains of FIGS. 3B–6B in response to potentiometer taps 63–66 being set so that comparators 71–74 derive positive, predetermined voltages in response to the voltages at taps 63–66 being 10%, 30%, 50% and 70% of the peak amplitude of the voltage applied to potentiometer 62 over a complete cycle of the speech waveform. The number of negative going transitions in each of the binary waveforms of FIGS. 3B–6B is different to eliminate ambiguity of identification of the waveforms; for the waveform of FIGS. 3B there are four transitions, for FIG. 4B there are eight transitions, for FIG. 5 there are five transitions, and for FIG. 6 there are seven transitions. In contrast, there is one positive going, zero crossing for FIGS. 3A and 5A and two positive going, zero crossings for the waveforms of FIGS. 4A and 6A. The transitions of FIGS. 3B–6B are sensed by counter 21, causing the counter to be advanced by each of them.

In certain instances, it is possible that there may be ambiguity in the output of quantizer 17. In other words, two materially different speech waveforms applied to quantizer 17 may produce the same number of transitions. Such ambiguity can be virtually eliminated if the negative, as well as positive, portion of the speech waveform is detected by the quantizer. Both the positive and negative portions of the speech waveform may be analyzed by the quantizer, by feeding the output of capacitor 61 to a full wave rectifier that derives voltage divider 62 or by providing a complementary comparison network responsive to an inverted replica of the output of amplifier 101, and by providing additional gates in logic network 104 that are responsive to the signals developed by the complementary comparison network and are cascaded with gates 105–107.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for quantizing a speech waveform and/or a waveform that is a replica of an audio signal, such as a telephone ring, a knock or a siren, comprising means for establishing N signal level bands, where N is an interger more than two, adjacent ones of said bands having common boundaries, each of said boundaries being a predetermined percentage of the peak level of a complete cycle of the waveform, means responsive to the established bands for deriving a bilevel signal having a first level while the speech signal has an amplitude lying in even numbered ones of said bands and a second level while the speech signal has an amplitude lying in odd numbered ones of said bands.

2. The apparatus of claim 1 wherein the means for establishing the N signal level bands includes means for normalizing the peak amplitude of a phoneme of the speech waveform and a plurality of amplitude comparators, one of said comparators being provided for each boundary, each of said comparators being responsive to the normalized waveform and a predetermined amplitude level to derive an output signal having a first level in response to the normalized waveform having an amplitude less than the predetermined percentage for the boundary associated with the comparator.

3. Apparatus for analyzing a speech waveform and/or a waveform that is a replica of an audio signal, such as a telephone ring, a knock or a siren, comprising formant filter means responsive to the waveform for deriving first, second and third signals respectively representing the frequency content of the speech waveform in first, second and third formants, and means responsive to the first, second and third signals for separately normalizing the first and third signals relative to the second signal.

4. The apparatus of claim 3 further including means responsive to the normalized first and third signals for deriving an indication of a phoneme in the speech waveform.

5. The apparatus of claim 4 wherein the indication deriving means includes a memory having first and second inputs responsive to the normalized first and third signals, respectively.

6. The apparatus of claim 5 wherein the memory comprises a digital table look-up.

7. The apparatus of claim 5 further including a voiced/unvoiced detector responsive to the speech waveform and means for controlling the memory in response to voiced and unvoiced indications derived from the voiced/unvoiced detector.

8. The apparatus of claim 4 wherein the indicator means includes a display having first and second orthogonal axes, means for respectively controlling the display along said first and second axes in response to the normalized first and third signals.

9. The apparatus of claim 4 wherein the means for deriving the first signal includes means for quantizing an analog signal indicative of the first formant into a first pulse train, said means for quantizing including means for establishing N signal level bands, where N is an integer at least equal to two, adjacent ones of said bands having common boundaries, each of said boundaries being a predetermined precentage of the peak level of a complete cycle of a speech waveform, means responsive to the established bands for deriving a bilevel signal having a first level while the speech signal has an amplitude lying in even numbered ones of said bands and a second level while the speech signal has an amplitude lying in odd numbered ones of said bands.

10. The apparatus of claim 9 further including means for respectively quantizing analog signals indicative of the second and third formants into second and third pulse trains, and said means for normalizing includes means for counting the number of pulses in the first and third pulse trains over the interval required for the pulses in the second pulse train to reach a predetermined number.

11. The apparatus of claim 10 wherein the means for quantizing the analog signals indicative of the second and third formants includes a zero crossing detector responsive to the analog signals indicative of the second and third formants.

12. The apparatus of claim 4 further including means for respectively quantizing analog signals indicative of the first, second and third formants into first, second and third pulse trains, and said means for normalizing includes means for counting the number of pulses in the first, second and third pulse trains over the interval required for the pulses in the second pulse train to reach a predetermined number.

13. The apparatus of claim 4 further including means for periodically supplying the normalized signals to the means for indicating.

14. The apparatus of claim 3 wherein the means for deriving the first signal includes means for quantizing an analog signal indicative of the first formant into a first pulse train, said means for quantizing including: means for establishing N signal level bands, where N is an integer at least equal to two, adjacent ones of said bands having common boundaries, each of said boundaries being a predetermined percentage of the peak level of a complete cycle of a speech waveform, means responsive to the established bands for deriving a bilevel signal having a first level while the speech signal has an amplitude lying in even numbered ones of said bands and a second level while the speech signal has an amplitude lying in odd numbered ones of said bands.

15. The apparatus of claim 14 further including means for respectively quantizing analog signals indicative of the second and third formants into second and third pulse trains, and said means for normalizing includes means for counting the number of pulses in the first and third pulse trains over the interval required for the pulses in the second pulse train to reach a predetermined number.

16. The apparatus of claim 15 wherein the means for quantizing the analog signals indicative of the second and third formants includes a zero crossing detector responsive to the analog signals indicative of the second and third formants.

17. The apparatus of claim 3 further including means for respectively quantizing analog signals indicative of the first, second and third formants into first, second and third pulse trains, and said means for normalizing includes means for counting the number of pulses in the first, second and third pulse trains over the interval required for the pulse in the second pulse train to reach a predetermined number.

18. Apparatus for analyzing a speech waveform and/or a waveform that is a replica of an audio signal, such as a telephone ring, a knock or a siren, comprising formant filter means responsive to the waveform for deriving a pair of signals respectively representing the frequency content of the speech waveform in a pair of formants, and means responsive to the pair of signals for comparing the signals representing the speech in the pair of formants.

19. The apparatus of claim 18 wherein the means for deriving the pair of signals includes means for quantizing the waveform into first and second pulse trains having pulse rates indicative of the frequency contents in the formants, and means for counting the number of pulses in the first pulse train over the interval required for the pulses in the second train to reach a predetermined number.

20. The apparatus of claim 19 wherein the means for quantiziing the waveform into the first pulse train includes means for establishing N signal level bands, where N is an integer at least equal to two, adjacent ones of said bands having common boundaries, each of said boundaries being a predetermind percentage of the peak level of a complete cycle of the waveform, means responsive to the established bands for deriving a bilevel signal having a first level while the speech signal has an amplitude lying in even numbered ones of said bands and a second level while the speech signal has an amplitude lying in odd numbered ones of said bands.

21. The apparatus of claim 18 wherein the means for deriving one of the signals includes means for quantizing the waveform into a first pulse train, said quantizing means including means for establishing N signal level bands, where N is an integer at last equal to two, adjacent ones of said bands having common boundaries, each of said boundaries being a predetermined percentage of the peak level of a complete cycle of the waveform, means responsive to the established bands for deriving a bilevel signal having a first level while the speech signal has an amplitude lying in even numbered ones of said bands and a second level while the speech signal has an amplitude lying in odd numbered ones of said bands.

22. Apparatus for analyzing a speech waveform and/or a waveform that is a replica of an audio signal, such as a telephone ring, a knock or a siren comprising means responsive to the waveform for deriving first and second pulse trains respectively indicative of the frequency of the waveform in first and second formants, and means for counting the number of pulses in the first pulse train over the interval required for the pulses in the second train to reach a predetermined number.

23. The apparatus of claim 22 wherein the means for deriving one of the pulse trains includes means for establishing N signal level bands, where N is an integer at least equal to two, adjacent ones of said bands having common boundaries, each of said boundaries being a predetermined percentage of the peak level of a complete cycle of the waveform, means responsive to the established bands for deriving a bilevel signal having a first level while the speech signal has an amplitude lying in even numbered ones of said bands and a second level while the speech signal has an amplitude lying in odd numbered ones of said bands.

24. Apparatus for analyzing a speech waveform and/or a waveform that is a replica of an audio signal, such as a telephone ring, a knock or s siren, comprising formant filter means responsive to the waveform for deriving first, second and third signals respectively representing the frequency content of the speech waveform in first, second and third formants, means responsive to the first, second and third signals for normalizing the first signal relative to the second signal, and means responsive to the normalized first signal and a function of the third signal for deriving an indication of a phoneme in a speech waveform.

25. The apparatus of claim 24 wherein the indication deriving means includes a memory having first and second inputs responsive to the normalized first signal and the function of the third signal.

26. The apparatus of claim 25 wherein the memory comprises a digital table look-up.

27. The apparatus of claim 25 further including a voiced/unvoiced detector responsive to the speech waveform and means for controlling the memory in response to voiced and unvoiced indications derived from the voiced/unvoiced detector.

28. The apparatus of claim 24 wherein the indicator means includes a display having first and second orthogonal axes, means for respectively controlling the display along said first and second axes in response to the normalized first and third signals.

* * * * *